United States Patent Office 3,829,487
Patented Aug. 13, 1974

3,829,487
N-SUBSTITUTED-3,5-(TRIFLUOROMETHYL OR BROMO) BENZENESULFONAMIDES
Helmut H. Mrozik, Matawan, N.J., assignor to Merck & Co., Inc., Rahway, N.J.
No Drawing. Continuation of abandoned application Ser. No. 135,474, Apr. 19, 1971. This application Feb. 8, 1973, Ser. No. 330,533
Int. Cl. C07c 143/78, 143/80
U.S. Cl. 260—556 AR        7 Claims

ABSTRACT OF THE DISCLOSURE

Novel substituted benzenesulfonamides are useful as agents for the treatment of both mature and immature liver fluke infections. The benzenesulfonamide is substituted on the sulfonamide nitrogen with loweralkoxy, substituted loweralkyl and heterocyclic in which the sulfonamide nitrogen is included in the heterocyclic ring. The benzene ring is variously substituted at the 3- and 5-positions and unsubstituted or substituted with an amino group at the 4-position. Compositions containing these compounds for the treatment of mature and immature liver fluke infestation are also disclosed.

RELATIONSHIP TO OTHER APPLICATIONS

This application is a continuation of U.S. Ser. No. 135,474, filed Apr. 19, 1971, now abandoned.

SUMMARY OF THE INVENTION

This invention relates to novel sulfonamides and methods for their preparation. In particular this invention relates to novel N-substituted 3,5-disubstituted benzenesulfonamides. These novel compounds have antiparasitic and anthelmintic activity and are particularly active against liver fluke in sheep and cattle.

The novel sulfonamides are represented by the following structural formula:

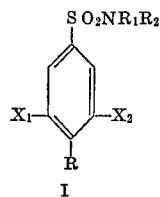

I wherein R is hydrogen or amino, $X_1$ and $X_2$ are each halogen, trifluoromethyl or nitro and $R_1$ and $R_2$ are hydrogen, loweralkoxy or substituted loweralkyl wherein the substituents are loweralkoxy, loweralkylthio, loweralkylsulfinyl, loweralkylsulfonyl, cyano, halo, or $R_1$ and $R_2$ together may form a heterocyclic ring of from 3 to 6 members containing the sulfonamido nitrogen as an integral member of the heterocyclic ring, provided that one of $R_1$ and $R_2$ is other than hydrogen. $R_1$ and $R_2$ may be the same or different in any specific compound except, of course, when together they form a hetero ring, or when one of them is hydrogen.

"Loweralkyl" and "loweralkoxy" are intended to include groups possessing from 1 to 5 carbon atoms, either straight or branched chain. Representative examples are methyl, ethyl, propyl, butyl, pentyl, isopropyl, tertbutyl methoxy, ethoxy, propoxy, butoxy, pentoxy, sec.-butoxy, neo-pentoxy, and the like.

"Loweralkylthio," "loweralkylsulfinyl," and "loweralkylsulfonyl" are also intended to include radicals having from 1 to 5 carbon atoms in a straight or branched chain configuration.

The term "halo" or halogen as used in the instant application includes fluorine, chlorine, bromine or iodine.

Examples of preferred heterocyclic groups substituted at the sulfonamide group, incorporating the sulfonamide nitrogen atom therein, are those saturated heterocycles containing one nitrogen atom, such as aziridinyl, azetidinyl, pyrrolidinyl, piperidinyl, and the like.

The novel compounds are useful as antiparasitic and anthelmintic agents. They are preferentially employed in the treatment of liver fluke in sheep and cattle and when so employed are combined with non-toxic carriers for either oral or parenteral use. These compositions and their method of use in treating liver fluke infestations thus form other aspects of the invention.

PREFERRED EMBODIMENTS OF THE INSTANT INVENTION

The preferred compounds of this invention are those compounds of Formula I above where $X_1$ and $X_2$ are each trifluoromethyl or bromo, and $R_1$ and $R_2$ are loweralkyl substituted with a loweralkoxy, loweralkylthio, loweralkylsulfinyl, or loweralkylsulfonyl radical as exemplified by the following compounds:

N,N-bis-(2-methoxyethyl)-3,5-dibromobenzene-
  sulfonamide,
N,N-bis-(2-methylthioethyl)-3,5-dibromobenzene-
  sulfonamide,
N-(2-methylsulfinylethyl)-3,5-bis-(trifluoromethyl)-
  benzenesulfonamide,
N-(2-methylsulfonylethyl)-3-bromo-5-trifluoro-
  methylbenzenesulfonamide,
4-amino-N,N-bis-(2-ethylsulfonylethyl)-3,5-di-
  (trifluoromethyl)-benzenesulfonamide,
4-amino-N-(2-ethoxypropyl)-3,5-dibromobenzene-
  sulfonamide,
4-amino-N-(2-propylthiopentyl)-3,5-di-(trifluoro-
  methyl)-benzenesulfonamide,
3-bromo-5-trifluoromethyl-N-(cyanomethyl)-
  benzenesulfonamide,
3-bromo-5-nitro-N-(β-chloroethyl)-benzene-
  sulfonamide,
4-amino-5-nitro-3-trifluoromethyl-N-(β-chloroethyl)-
  benzenesulfonamide.

The compounds of the instant invention may be prepared according to the process outlined in the following flow chart:

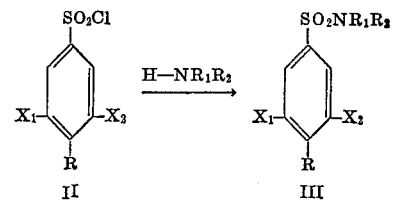

wherein R, $R_1$, $R_2$, $X_1$ and $X_2$ are as previously defined. In general, the process is run in a solvent. Solvents inert to the reaction which are satisfactory are those which dissolve both the amine and the benzenesulfonyl chloride. Solvents must be chosen, however, which will not react with the sulfonyl chloride group. Benzene, methylene chloride, chloroform, tetrahydrofuran, toluene and the like are satisfactory. During the reaction one mole of hydrogen chloride is liberated and it is preferred to have at least one mole of base present to neutralize this acid. Bases such as tertiary amines are suitable with triethyl amine and pyridine being preferred. The tertiary amine may also be used in large excess and serve as the solvent medium. Another method of effecting the same result is to use a large excess of the primary or secondary amine that is being reacted with the sulfonyl chloride. This is particularly advantageous where the reacting amine is readily available and not expensive. Alternatively, an inorganic base such as an alkali metal carbonate or bicarbonate may be suspended in the organic solvent to neutralize the liberated acid.

The reaction is run, in all of the above embodiments, at a temperature of from room temperature to the reflux temperature of the solvent employed. The particular temperature will depend on the reactivity of the particular reactants. The reaction is generally run for a duration of from 1 to 36 hours, the preferred duration of the reaction being inversely proportional to the temperature employed. In general, the reaction is complete in about 10 hours at room temperature.

The benzenesulfonylchloride starting materials are prepared by various methods outlined in the following reaction scheme:

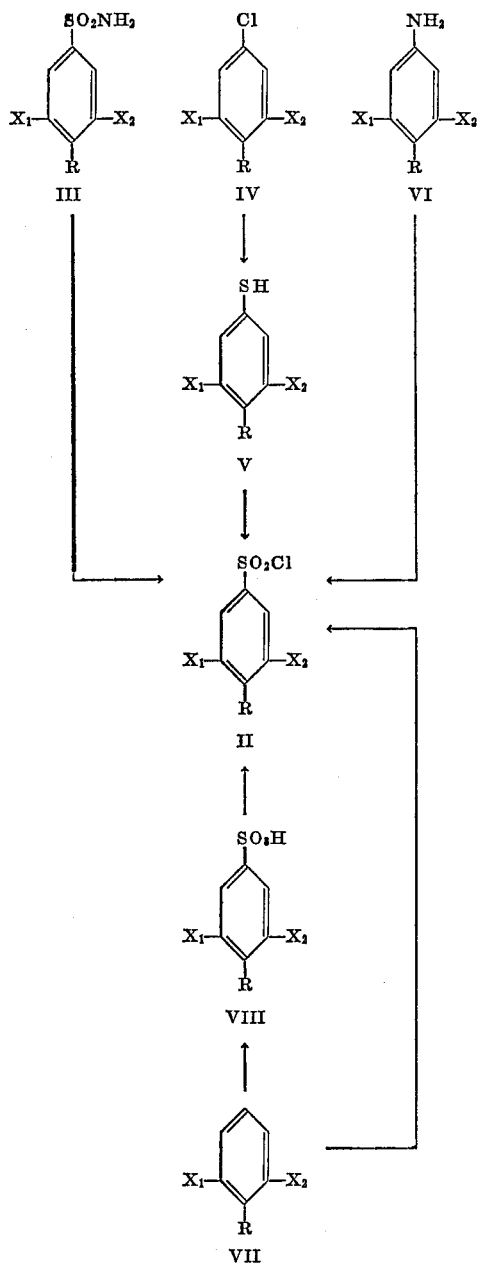

wherein $X_1$, $X_2$ and R are as previously defined. In the reaction sequence III→II, the benzenesulfonamide is treated with chlorosulfonic acid, at a temperature of from 50 to 150° C. for from 10 minutes to 5 hours. The resulting sulfonyl chloride is isolated by pouring the cooled reaction mixture into ice water and recovering the product by techniques known to those skilled in the art.

In the reaction sequence IV→V→II, the chlorine atom of the appropriately substituted chlorobenzene is replaced by a mercapto group by treatment with sodium sulfide, and the mercapto group, upon treatment with chlorine gas in acetic acid medium affords the benzenesulfonyl chloride. The reaction generally proceeds to completion in from ½ to 5 hours at a temperature of from 10 to 50° C. with room temperature (25° C.) being preferred. The desired benzenesulfonyl chloride is isolated by techniques and procedures known to those skilled in the art.

In the reaction sequence VI→II, the amino compound VI is converted to the sulfonyl chloride by diazotizing the amine in the presence of $CuCl_2$ and $SO_2$. The amine, in acidic medium, upon treatment with an alkali metal nitrite, preferably sodium nitrite, forms a diazonium compound which is not isolated, but rather treated with cupric chloride and sulfur dioxide in an acidic aqueous on the molecule it must be protected, such as by forming the acyl derivative thereof, if diazotization is not desired on both amine functions. The acyl derivative is formed by procedures known to those skilled in the art and the same may be removed by acid or base catalyzed hydrolysis in an aqueous medium.

In the reaction sequence VII→VIII→II, the benzene derivative VII is treated wth a sulfonating agent, generally fuming sulfuric acid, to form the benzenesulfonic acid compound VIII which on treatment with a chlorinating agent, such as phosphorous pentachloride, gives the sulfonyl chloride. The sulfonating step generally is run without a solvent, the fuming sulfuric acid acting as its own solvent, at a temperature of from 25–75° C. with 35–50° C. being preferred, for from 10 minutes to 5 hours. The chlorination reaction generally requires heating at a tempearture of from 50 to 100° C. for from 10 minutes to 2 hours.

The above process may be affected in one step (VII→II) using chlorosulfonic acid. The reaction is run at a temperature of from about 0° C. to 100° C. for from about ½ to 5 hours. Since the temperature of the reaction is inversely proportional to the duration of the reaction higher temperatures will require a shorter period of heating. Generally, the reaction is complete at a temperature of from 50° to 75° C. in from 1 to 2 hours.

Certain of the compounds of formula I are prepared using reactions in which the process II→I is not the final step. The loweralkylsulfonylloweralkyl, and lower-alkyl-sulfonylloweralkyl derivatives of the sulfonamide group are prepared by oxidizing the loweralkylthioloweralkyl derivative. Generally oxidizing agents such as m-chloroperbenzoic acid or aqueous hydrogen peroxide are employed.

The halogenation step is often accomplished subsequent to the preparation of the sulfonamide or sulfonyl chloride derivative. It has been found that the halogenation, if it is not to interfere with other substituents or reactions, is often preferred to be run as the final step. It is run using a source of molecular halogen such as liquid bromine or gaseous chlorine in an inert solvent.

The 1-loweralkoxyloweralkyl derivative is not necessarily prepared directly from the benzenesulfonyl chloride derivative but rather the benzenesulfonamide compound derived therefrom by treatment with ammonia. The sodium salt of the benzenesulfonamide prepared from the latter compound and sodium hydride, when treated with a haloloweralkylloweralkyl ether affords the N-loweralkoxyloweralkyl derivative.

The N-(loweralkoxy) derivative is prepared from the sulfonyl chloride derivative using an o-(loweralkyl) hydroxylamine compound under conditions similar to those employed in reacting the sulfonyl chloride derivative with an amine.

Derivatives of the compounds of formula I can be prepared by reactions which operate on the substituent groups $X_1$, $X_2$ and R. Such reactions may be in the form of protecting a sensitive group, such as an amine. The amine group is protected by forming the acyl derivative. This reaction is particularly important when the substituted 4-aminobenzenesulfonyl chloride intermediate is desired. By protecting the amine function with an acyl group the amine is rendered immune from attack. Simple acid or base catalyzed hydrolysis liberates the free amine when it is desired.

It has been found, however, that where the 4-amino compound is also substituted at the 3- and 5-positions with a large bulky group, such as bromine, protection of the amine is not necessary as the large groups insulate the amine function from attack as efficiently as an acyl protecting group would.

The trifluoromethyl group is usually present in the initial starting material owing to the stability of the group and the relative difficulty in synthesizing the group. The nitro group is synthesized by standard nitration reactions usually at an early stage of the synthetic scheme.

The particular substituent desired in a compound of formula I will often determine the sequence of reactions employed to prepare said compound. The halogenation step can usually be carried out at any point of the reaction sequence, so long as the presence of the halogen atoms does not adversely affect other groups on the molecule. The various reaction schemes of this reaction are illustrated by the detailed examples below.

The invention is illustrated by the following examples which are included so that the invention might be more fully understood. They should not be construed as being limitative of the invention.

EXAMPLE 1

4-Amino-3,5-dibromobenzenesulfonylchloride

A solution of 15 g. of 4-amino-3,5-dibromobenzenesulfonamide in 45 ml. of chlorosulfonic acid is heated on a steam bath at 95° C. for two hours. The reaction mixture is cooled and poured onto 400 ml. of ice/water mixture. The resultant precipitate is filtered, dissolved in methylene chloride, and the methylene chloride solution is dried, filtered and evaporated to dryness, affording 4-amino-3,5-dibromobenzenesulfonyl chloride, m.p. 153–155° C.

EXAMPLE 2

4-Amino-3,5-dibromo-N-($\beta$-chloroethyl)-benzenesulfonamide

2-Chloroethylamine hydrochloride (1.89 g., 0.015 moles) is suspended in 30 ml. of acetone and 3.3 g. (0.03 moles) of triethyl amine is added thereto. This solution is added to a cooled solution of 5.10 g. (0.015 moles) of 4-amino-3,5-dibromobenzene sulfonyl chloride, dissolved in 45 ml. of acetone. The resultant mixture is stirred at room temperature for 3 hours after which 5 volumes of water is added with cooling. The suspension is filtered and the precipitate washed with water and dried. The dried precipitate is recrystallized from benzene affording 4-amino - 3,5 - dibromo - N - ($\beta$ - chloroethyl) - benzenesulfonamide.

When in the above procedure 2-bromoethylamine is employed in place of 2-chloroethylamine there is obtained 4 - amino - 3,5 - dibromo - N - ($\beta$ - bromoethyl) - benzenesulfonamide.

EXAMPLE 3

4-Nitro-3-trifluoromethylbenzenesulfonyl chloride (A) 4-Nitro-3-trifluoromethylbenzenethiol.—A stirred solution of sodium sulfide monohydrate 65.4 g. (0.276 moles) in 1 liter of water is treated with 50 g. (0.222 moles) of 4-chloro-2-trifluoromethylnitrobenzene in 500 ml. of acetone over 1½ hour. The reaction mixture is stirred for 14½ hours and the resultant solution treated with 25 ml. of concentrated hydrochloric acid. An oil separates from the reaction mixture which is dissolved in 200 ml. of ether, washed with water and extracted with 2.5 N sodium hydroxide solution. The aqueous solution is washed with ether and acidified with 25 ml. of hydrochloric acid. The resulting oil is extracted with ether and the ether solution washed with water affording 47 g. of 4-nitro-3-trifluoromethylbenzenethiol which is used in the next step.

(B) 4 - Nitro - 3 - trifluoromethylbenzenesulfonyl chloride.—A solution of 47 g. of 4-nitro-3-trifluoromethylbenzenethiol in 100 ml. of glacial acetic acid is added dropwise to 1 liter of saturated chlorine water with continuous stirring at from 0–10° C. During the addition the concentration of chlorine is maintained by bubbling fresh chlorine gas into the solution. Stirring is continued for 1½ hours and the gummy solid precipitate filtered, washed with water and dried at room temperature affording 22.3 g. of a gummy solid. The solid material is taken up in methylene chloride and dried over magnesium sulfate, filtered and evaporated affording an oil which is used without purification in subsequent steps.

EXAMPLE 4

4-Nitro-3-trifluoromethyl-N-($\beta$-chloroethyl)-benzenesulfonamide

2-Chloroethylamine hydrochloride (0.63 g., 0.005 moles), and (0.01 moles) of pyridine are combined in 10 ml. of acetone. The solution is cooled and added to a cooled solution of (0.005 moles) of 4-nitro-3-trifluoromethyl benzenesulfonyl chloride dissolved in 15 ml. of acetone. The reaction mixture is stirred at room temperature for three hours. The reaction mixture is diluted with 5 volumes of water and the resultant precipitate filtered, washed twice with water, dried, and recrystallized from ethanol affording 4-nitro-3-trifluoromethyl-N-($\beta$-chloroethyl)-benzenesulfonamide.

EXAMPLE 5

4-Amino-3-trifluoromethyl-N-($\beta$-chloroethyl)-benzenesulfonamide

4 - Nitro - 3 - trifluoromethyl - N - ($\beta$ - chloroethyl)-benzenesulfonamide (1.22 g., .0037 moles) is combined with 0.50 g. of 5% ruthenium on carbon in 20 ml. of anhydrous ethanol at room temperature. The reaction mixture is hydrogenated at 40 lbs. hydrogen pressure for 5 hours during which time the hydrogen uptake reaches 100% of theory. The reaction mixture is filtered, the solvent evaporated in vacuo, and the residue recrystallized from toluene affording 4-amino-3-trifluoromethyl-N-($\beta$-chloroethyl)-benzenesulfonamide.

EXAMPLE 6

4-Amino-5-bromo-3-trifluoromethyl-N-($\beta$-chloroethyl)-benzenesulfonamide

4 - Amino - 3 - trifluoromethyl - N - ($\beta$ - chloroethyl)-benzenesulfonamide (0.880 g., 0.0029 moles) is combined with 7 ml. of water and 7 ml. of 48% HBr. The mixture is stirred at room temperature and 0.47 g. (0.16 ml.) of liquid bromine is added dropwise over 3 hours. The suspension is filtered and the solid material washed with aqueous sodium bicarbonate and water and dried. The dried powder is recrystallized from toluene to afford 4-amino-5-bromo - 3 - trifluoromethyl-N-($\beta$-chloroethyl)-benzenesulfonamide.

EXAMPLE 7

3,5-Dibromo-N-($\beta$-methylthioethyl)-benzenesulfonamide (A) 3,5-Dibromobenzenesulfonylchloride.—69.0 g. of 3,5-dibromobenzenesulfonamide and 210 ml. of chlorosulfonic acid are combined and heated on a steam bath for 2 hours. The reaction mixture is cooled and poured very cautiously into 1500 g. of an ice/water mixture. The resultant suspension is filtered, washed with water, and dried. The dried 3,5-dibromobenzenesulfonylchloride is of sufficient purity for use in subsequent steps without further purification, m.p. 55–58° C.

(B) 3,5 - Dibromo - N - (β - methylthioethyl)-benzene sulfonamide.—3.34 g. of 3,5-dibromobenzenesulfonylchloride is dissolved in 15.0 ml. of acetone. A solution of 2.5 g. of 2-methylthioethylamine dissolved in 15 ml. of acetone is added to the first solution in one portion. A severe exotherm is observed initially and the reaction is stirred at room temperature for 1 hour. The reaction mixture is diluted with an equal volume of water, filtered, and the solid material is washed with water. The solid is dissolved in methylenechloride, dried with $MgSO_4$ and evaporated to dryness in vacuo. The residue is recrystallized from ethanol affording 1.93 g. of 3,5-dibromo-N-(β-methylthioethyl)-benzenesulfonamide, m.p. 89–91° C.

EXAMPLE 8

3,5-Dibromo-N-(β-methylsulfonylethyl)-benzenesulfonamide m-Chloroperbenzoic acid (0.896 g.) of 85% purity is dissolved in 20 ml. of chloroform and added dropwise with stirring to a solution of 0.778 g. of 3,5-dibromo-N-(β-methylthioethyl)-benzenesulfonamide in 30 ml. of chloroform. The reaction mixture is stirred for two hours after the addition is complete. The solution is washed once with aqueous saturated sodium bicarbonate and twice with water and dried over magnesium sulfate. The solution is then evaporated in vacuo and the residue recrystallized from ethanol affording 3,5-dibromo-N-(β-methylsulfonylethyl)-benzenesulfonamide, m.p. 138 to 140° C.

EXAMPLE 9

3,5-Dibromo-N-(β-methylsulfinylethyl)-benzenesulfonamide m-Chloroperbenzoic acid (0.424 g.) of 85% purity is dissolved in 8 ml. of chloroform and added over a 10 minute period to a solution of 0.778 g. (0.002 moles) 3,5-dibromo-N-(β - methylthioethyl)-benzenesulfonamide dissolved in 12 ml. of chloroform. The reaction mixture is stirred at room temperature for two hours and the precipitate filtered. The precipitate is washed once with chloroform and dried. The combined chloroform filtrates are worked up as in Example 8, and combined with the above precipitate and the residue recrystallized from ethanol affording 3,5-dibromo-N-(β-methylsulfinylethyl)-benzenesulfonamide, m.p. 170 to 171° C.

EXAMPLE 10

3,5-Bis-trifluoromethylbenzenesulfonylchloride

A solution of 3,5-bis-trifluoromethylaniline (11.4 g.) 0.05 moles, in 40 ml. of glacial acetic acid is treated at room temperature with 8.1 ml. of concentrated hydrochloric acid. The solution is cooled to from −5 to 0° C. and treated with a solution of 3.50 g. (0.051 moles) of sodium nitrite in 7.0 ml. of water over 10 minutes. The resulting suspension is stirred at 0° C. for one hour. This solution is added to a suspension of 50 ml. of glacial acetic acid and 1.0 g. of cupric chloride which is saturated with sulfur dioxide at 0° C. During the addition, gas is evolved from the reaction mixture and when the gas evolution ceases, the rection mixture is further saturated with sulfur dioxide at room temperature, bubbling the sulfur dioxide into the reaction mixture for approximately 20 minutes. The sulfur dioxide bubbling is stopped and the reaction is stirred at room temperature for 1 hour. The solution is poured onto ice, filtered, and the solid dried affording 12.45 g. of 3,5-bis-trifluoromethylbenzenesulfonyl-chloride. It is of sufficient purity to be used as is in the next step.

EXAMPLE 11

3,5-Bis-trifluoromethyl-N-(β-cyanoethyl)benzenesulfonyl chloride 3.38 g. (0.01 moles) of amino acetonitrile bisulfate is suspended in 20 ml. of pyridine and the suspension cooled to 0° C. 3.34 g. (0.01 moles) of 3,5-bis-(trifluoromethyl)-benzenesulfonyl chloride is added thereto portionwise without a solvent. The reaction mixture is stirred at room temperature overnight and poured onto an ice/water mixture. The resulting oil is extracted from the aqueous solution with ether and the ether solution dried over magnesium sulfate, filtered and the filtrate evaporated in vacuo to dryness. The residue is recrystallized from ethanol affording pure 3,5 - bis-trifluoromethyl-N-(β-cyanoethyl)-benzenesulfonylchloride.

EXAMPLE 12

3,5-Dibromo-N-(β-chloroethyl)-benzenesulfonamide

2-Chloroethylamine hydrochloride (0.63 g., 0.005 moles) is suspended in 10 ml. of acetone and 1.1 g. (0.01 moles) of triethylamine is added thereto. This solution is added to a cooled solution of 1.67 g. (0.005 moles) of 3,5-dibromobenzenesulfonylchloride dissolved in 15 ml. of acetone. The resultant mixture is stirred at room temperature for two hours and five volumes of water is added with cooling. The resultant suspension is filtered and the precipitate washed twice with water and dried. The dried precipitate is recrystallized from benzene affording 3,5-dibromo-N-(β-chloroethyl)-benzenesulfonamide, m.p. 123 to 125° C.

When in the above procedure bis-2-chloroethylamine is employed in place of 2-chloroethylamine there is obtained 3,5-dibromo-N,N - bis - (β-chloroethyl)-benzenesulfonamide.

EXAMPLE 13

3,5-Dibromo-N-(cyanomethyl)-benzenesulfonamide

A suspension of 1.69 (0.011 moles of aminoacetonitrile bisulfate in 10 ml. of pyridine is cooled to 0° C. and 1.67 g. (0.005 moles) of 3,5-dibromobenzenesulfonylchloride is added portionwise. The reaction mixture is stirred at room temperature overnight and poured onto an ice/water mixture resulting in an oily precipitate. The oil is extracted with ether and the ether solution dried over magnesium sulfate and evaporated to dryness. The residue is recrystallized from ethanol affording 3,5-dibromo-N-(cyanomethyl)-benzenesulfonamide, m.p. 129 to 131° C.

When in the above procedure 3-bromo-5-nitrobenzenesulfonylchloride, 3 - bromo-5-trifluoromethylbenzenesulfonylchloride or 3-nitro-5-trifluoromethylbenzenesulfonylchloride is employed in place of 3,5-dibromobenzenesulfonylchloride there is obtained 3-bromo-N-(cyanomethyl)-5-nitrobenzenesulfonamide, 3-bromo-N-(cyanomethyl)-5-trifluoromethylbenzenesulfonamide, and N-(cyanomethyl)-3-nitro-5-trifluoromethylbenzenesulfonamide, respectively.

EXAMPLE 14

4-Amino-3,5-dibromo-N,N-bis-(methoxymethyl)-benzenesulfonamide

4-Amino-3,5-dibromobenzenesulfonamide (3.3 g., 0.01 moles) is dissolved in 15 ml. of dimethyl formamide and 0.468 g. of 54% sodium hydroxide dispersion in mineral oil is added in one portion. Vigorous evolution of hydrogen is observed as the mixture is stirred for 15 minutes at room temperature. The resultant solution is cooled and treated with 0.638 g. of chloromethylmethyl ether in 5 ml. of dimethylformamide dropwise. A precipitate immediately results. The reaction mixture is stirred at room temperature for 1 hour and poured onto 150 ml. of ice water. A milky, turbid suspension results which is stirred for 1 hour at 0° C. The gummy material (starting material) is filtered and the filtrate evaporated to dryness. The residue is washed with ether and the ether solution evaporated to dryness. The residue is recrystallized from ethanol affording 4 - amino-3,5-dibromo-N,N-bis-(methoxymethyl)-benzenesulfonamide, m.p. 115 to 117° C.

EXAMPLE 15

4-Acetamido-3-nitrobenzenesulfonylchloride 116.8 g. (0.50 moles) of 4-acetamidobenzenesulfonylchloride is dissolved in 600 ml. of concentrated sulfuric acid and cooled to 5° C. A previously combined mixture of 45 ml. of concentrated nitric acid and 50 ml. of concentrated sulfuric acid is added dropwise at such a rate that the temperature is maintained at from 3 to 6° C. When the addition is complete stirring is continued for 75 minutes at 5° C. The reaction mixture is poured into 2.5 l. of ice with caution. The supernatant liquid is decanted and the residual material dissolved in hot benzene, separated from residual water, cooled and dried over sodium sulfate. The benzene solution is filtered and the filtrate evaporated to dryness. The residue is triturated with ether and the solid material filtered and used as is in the next step.

EXAMPLE 16

4-Acetamido-3-nitro-N-($\beta$-methylthioethyl)-benzenesulfonamide

A solution of 2.5 g. of 2-methylthioethylamine in 20 ml. of acetone is added to a solution of 2.78 g. of 4-acetamido-3-nitrobenzenesulfonylchloride in 20 ml. of acetone in one portion. The reaction is stirred at room temperature for 1 hour and diluted with 50 ml. of water. The aqueous suspension is filtered and the solid material washed with water and dried. The dried solid is recrystallized from ethanol affording pure 4-acetamido-3-nitro-N-($\beta$-methylthioethyl)-benzenesulfonamide.

EXAMPLE 17

4-Amino-3-nitro-N-($\beta$-methylthioethyl)-benzenesulfonamide 7.5 g. of 4-acetamido-3-nitro-N-($\beta$-methylthioethyl)benzenesulfonamide and 60 ml. of 6N hydrochloric acid are combined and heated at reflux for 2 hours. The reaction mixture is cooled in an ice bath, filtered and the solid material washed with cold water. The product is dried in air affording 4-amino-3-nitro-N-($\beta$-methylthioethyl)-benzenesulfonamide of sufficient purity to be used without change in the next step.

EXAMPLE 18

4-Amino-3-bromo-5-nitro-N-($\beta$-methylsulfonylethyl)-benzenesulfonamide

Following the procedure of Example 8, 0.58 g. of 4-amino - 3 - nitro-N-($\beta$-methylthioethyl)benzenesulfonamide is oxidized using 0.896 g. of m-chloroperbenzoic acid in 50 ml. of chloroform, to 4-amino-3-nitro-N-($\beta$-methylsulfonylethyl)-benzenesulfonamide.

1.0 g. of the above compound is combined with 15 ml. of methanol at room temperature and brominated with 0.52 g. of liquid bromine. The precipitated solid is filtered and recrystallized from ethanol affording 4-amino-3-bromo-5-nitro - N - ($\beta$ - methylsulfonylethyl)-benzenesulfonamide.

EXAMPLE 19

3,5-Dibromo-N,N-ethylenebenzenesulfonamide 1.67 g. (0.005 moles) of 3,5-dibromobenzenesulfonylchloride is suspended in 10 ml. of methanol and cooled to 0° C. To this solution is added a solution of .215 g. (.0065 moles) of aziridine dissolved in 0.5 ml. of methanol. The reaction mixture is stirred at room temperature for 1 hour. The solid precipitate is filtered and recrystallized from isopropanol affording 0.31 g. of 3,5-dibromo-N,N-ethylenebenzenesulfonamide, m.p. 128 to 131° C.

When in the above procedure azetidine, pyrrolidine, or piperidine is employed in place of aziridine there is obtained 3,5 - dibromo-N,N-trimethylbenzenesulfonamide, 3,5-dibromo - N,N - tetramethylenebenzenesulfonamide, and 3,5-dibromo - N,N - pentamethylenebenzenesulfonamide.

EXAMPLE 20

4-Amino-3,5-dibromo-N-methoxybenzenesulfonamide (A) 4 - Amino-N-methoxybenzenesulfonamide.—A solution of 6.1 g. of o-methylhydroxylamine hydrochloride in 40 ml. pyridine is cooled to 10° C. and treated portionwise with 17.1 g. of 4-acetamidobenzenesulfonylchloride. The temperature is maintained at 10–14° C. during the addition. The reaction mixture is stirred overnight at room temperature and poured onto 500 ml. of an ice/water mixture and filtered. The solid material is dried and suspended in 200 ml. of dilute hydrochloric acid prepared by combining 35.4 ml. of concentrated hydrochloric acid and 165 ml. of water. The suspension is heated at reflux for 1 hour, the resultant solution cooled and treated with 65 g. of sodium acetate to a pH of 6. The precipitate is filtered, washed with water and recrystallized from boiling water. The resultant 4-amino-N-methoxybenzenesulfonamide has a m.p. of 135–137° C.

(B) 4-Amino - 3,5-dibromo-N-methoxybenzenesulfonamide.—2.02 g. of 4-Amino-N-methoxybenzenesulfonamide is dissolved in 3.5 ml. of 48% aqueous hydrobromic acid and 35 ml. of water and brominated with 1.1 ml. of liquid bromine. The reaction mixture is stirred for 10 minutes, filtered, washed with water, dried, and recrystallized from ethanol affording 4-amino-3,5-dibromo-N-methoxybenzenesulfonamide, m.p. 208–210° C.

The compounds of the present invention have utility in the field of animal therapy. They are effective anthelmintics and are especially effective against both mature and immature liver fluke of the species Fasciola gigantica and Fasciola hepatica, the common liver fluke in sheep and cattle. The preferred dosage levels depend on the type of compound to be employed, the type of animal to be treated, the particular helminth to be combatted, and the severity of the helminthic infestation. In general, effective fluke eradication is achieved when the compounds are administered orally at dosage levels of from about 1 to 300 mg./kg. of animal body weight and preferably from about 10 to 100 mg./kg. of animal body weight. The compounds of the present invention may be administered in a variety of ways depending upon the particular animal employed, the type of anthelmintic treatment normally given to such animal, the materials employed and the particular helminths being combatted. It is preferred to administer them in anthelmintically effective amounts in a single oral or parenteral, most preferably oral, dose at a time when fluke infection is apparent or suspected in the animal.

In addition to the inactive ingredients in the composition, said composition may contain one or more other active ingredients which may be selected from the compounds described by formula I or from other known anthelmintic agents. Beneficial results are obtained when the compounds of formula I are combined with an anthelmintic agent such as 2-(4-thiazolyl)-benzimidazole (thiabenzazole) or dl - 2,3,4,6 - tetrahydro-6-phenylimidazo-[2,1-b]-thiazole(tetramisole) known anthelmintic agents.

In general, compositions containing the active anthelmintic compound are employed. The amounts of the anthelmintic ingredient in the composition as well as the remaining constituents vary according to the type of treatment to be employed, the host animal and the particular helmintic infestation being treated. In general, however, compositions suitable for oral administration, containing a total weight percent of the active compound or compounds ranging from 0.01 to 95% will be suitable with the remainder of the compositions being any suitable carrier or vehicle. A number of modes of treatment may be employed and each to some extent determines the general nature of the composition. For example, the anthelmintic compounds may be administered to domesticated animals in a unit oral dosage form such as a tablet, bolus, capsule, or drench; a liquid oil base form suitable for parenteral administration, or they may be compounded as a feed premix to be later admixed with the animals feedstuff. When the compositions are to be solid unit dosage forms as in tablets, capsules, or boluses, the ingredients other than the active compounds may be any other non-toxic vehicle convenient in the preparation of such forms and preferably materials nutritionally suitable such as starch, lactose, talc, magnesium stearate, vegetable gums and the like. Moreover, when capsules are employed, the active compound may be used in essentially undiluted form, the only extraneous material being that of the capsule casing itself which may be hard or soft gelatin or any other acceptable encapsulating material. When the dosage form is to be used for parenteral administration the active material is suitably admixed with an acceptable oil base vehicle preferably of the vegetable oil variety such as peanut oil, cotton seed oil, and the like. In all such forms, that is, in tablets, boluses, capsules and oil base formulations, the active compound conveniently ranges from about 5 to 80% by weight of the total composition.

When the compounds are used in the form of a drench, the anthelmintic agents may be mixed with or adsorbed on agents which will aid in the subsequent suspending of the active compounds in water such as bentonite, clays, silica, water soluble starches, cellulose derivatives, gums, surface active agents and the like to form a dry pre-drench composition, and this pre-drench composition added to water just before use. In the pre-drench formulation, in addition to the suspending agent, such ingredients as preservatives, anti-foam compounds or other suitable diluents or solvents may be employed. Such a dry product may contain as much as 95% by weight of the active compound, the rest being excipient. Preferably, the solid composition contains from 30 to 95% by weight of the active compound. Enough water should be added to the solid product to provide the proper dosage level with a convenient amount of liquid for a single oral dose. The commonly used measure in the field is 1 fluid ounce of material and thus 1 fluid ounce of drench should contain enough of the anthelmintic compound to provide an effective dosage level. Liquid drench formulations containing from 10 to 50% by weight of dry ingredients will in general be suitable with a preferred range being from 15 to 25 weight percent.

When the compositions are intended to be used in feeds, feed supplements or feed premixes, they will be mixed with suitable ingredients of the animals nutrient ration. Solid orally ingestible carriers normally used for such purposes such as distillers dried grains, corn meal, citrus meal, fermentation residues, ground oyster shells, citrus meal, Attapulgus clay, wheat shorts, molasses solubles, corn cob meal, vegetable substances, toasted dehylled soya flour, soya bean meal feed, antibiotic mycellia, soya grits, crushed limestone and the like are all suitable. The active compounds are immediately dispersed or admixed throughout the active solid carrier by methods such as grinding, melting, or tumbling. By selecting a proper diluent and by altering the ratio of carrier to active ingredient, compositions of any desired concentration may be prepared. Feed supplement formulations containing from about 10 to 30% of active ingredient are particularly suitable for addition to feeds. The active compound is normally dispersed or mixed uniformly in the diluent but in some instances may be adsorbed on the carrier.

These supplements are added to the finished animal feed in an amount adequate to give the final concentration desired for controlling or treating the helminth infection by way of animal ration. Although the preferred level in feeds will depend on the particular compounds being employed, the active compounds of this invention are normally fed at levels of 0.01 to 3%. As stated above, animals are preferably treated at a time when the infestation is apparent or suspected. The most preferred method of such treatment is with single oral doses. Thus, administration of medicated feed is not preferred but may be employed. Similarly, the amounts of drug present in the feed may be reduced to levels in the order of 0.01% to 0.5% by weight, based on the weight of the feed and the medicated feed administered over prolonged periods. This could be in the nature of a preventive or prophylactic measure. Another method of administering the compounds of this invention to animals whose feeds are conveniently pelleted such as sheep is to incorporate them directly into the pellets. For instance, the anthelmintic compounds are readily incorporated in the nutritionally adequate alfalfa pellets at levels of 2 to 10 g. per pound for therapeutic use and lower levels for prophylactic use, and such pellets fed to the animals.

Examples of compositions suitable for administration to animals are:

A typical bolus composition is as follows:

| | |
|---|---|
| N,N-*bis*-(2 - methoxymethyl) - 3,5 - dibromobenzenesulfonamide _____ g__ | 7.0 |
| Dicalcium phosphate _____ g__ | 1.0 |
| Starch _____ g__ | 0.7 |
| Guar gum _____ g__ | 0.16 |
| Talc _____ g__ | 0.11 |
| Magnesium stearate _____ g__ | 0.028 |

A typical drench composition is as follows:

| | |
|---|---|
| N-(2 - methylsulfonylethyl) - 3 - bromo - 5 - trifluoromethylbenzenesulfonamide _____ g__ | 5.0 |
| Benzalkonium chloride _____ ml__ | 0.6 |
| Antifoam emulsion _____ g__ | 0.06 |
| Hydroxyethyl cellulose _____ g__ | 0.3 |
| Sodium phosphate monobasic _____ ml__ | 0.3 |
| Water, q.s. to 30 ml. | |

Examples of typical feed premix supplements are as follows:

(A)

| | |
|---|---|
| N-(2 - methylsulfonylethyl) - 3,5 - dibromobenzenesulfonamide _____ lbs__ | 15 |
| Wheat shorts _____ lbs__ | 85 |

(B)

| | |
|---|---|
| 4 - amino-N,N-bis-(2 - methylthioethyl) - 3,5 - dibromobenzenesulfonamide _____ lbs__ | 10 |
| Soybean mill feed _____ lbs__ | 90 |

The above feed premix supplements are combined with the animals regular feed, intimately mixing therewith such that the final concentration of the active ingredient is from 0.01 to 3% by weight.

What is claimed is:

1. A compound having the formula:

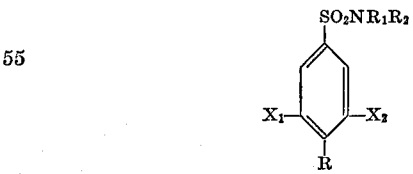

wherein R is hydrogen; $X_1$ and $X_2$ are each trifluoromethyl or bromo; and $R_1$ and $R_2$ are hydrogen, or substituted loweralkyl wherein the substitutes are loweralkoxy, loweralkylthio, loweralkylsulfinyl, loweralkysulfonyl, provided that at least one of $R_1$ and $R_2$ is other than hydrogen.

2. The compound of Claim 1 in which $X_1$ and $X_2$ are bromine.

3. The compound which is N-(2-chloroethyl)-3,5-dibromobenzenesulfonamide.

4. The compound of Claim 2 which is N-(β-methylthioethyl)-3,5-dibromobenzenesulfonamide.

5. The compound of Claim 2 which is N-(2-methylsulfinylethyl)-3,5-dibromobenzenesulfonamide.

6. The compound of Claim 2 which is N-(2-methylsulfonylethyl)-3,5-dibromobenzenesulfonamide.

7. The compound of Claim 1 in which $X_1$ and $X_2$ are trifluoromethyl.

References Cited

UNITED STATES PATENTS

| 3,322,828 | 5/1967 | Muth et al. | 260—556 AR |
| 2,725,390 | 11/1955 | Fogelman et al. | 260—556 B |
| 2,507,408 | 5/1950 | Jacob | 260—268 S |

FOREIGN PATENTS

| 17,789 | 8/1965 | Japan | 260—556 AR |

OTHER REFERENCES

C.A., 53:9115d (1959), Kretov et al.
C.A., 53:17955e (1959), Kretov et al.

JOHN D. RANDOLPH, Primary Examiner

S. D. WINTERS, Assistant Examiner

U.S. Cl. X.R.

260—397.7 R, 556 B, 453 R, 465 E, 239 E, 239 A, 326.82, 293.73, 239.8, 239.6, 543 R, 607 R, 508, 505 R; 424—267, 274, 244, 321